June 14, 1955     W. M. GARING     2,710,452

PANTOGRAPH ATTACHMENT

Filed April 7, 1952     3 Sheets-Sheet 1

Wilbur M. Garing
INVENTOR.

BY *Clarence A. O'Brien and Harvey B. Jacobson*
Attorneys

June 14, 1955  W. M. GARING  2,710,452
PANTOGRAPH ATTACHMENT
Filed April 7, 1952  3 Sheets-Sheet 2
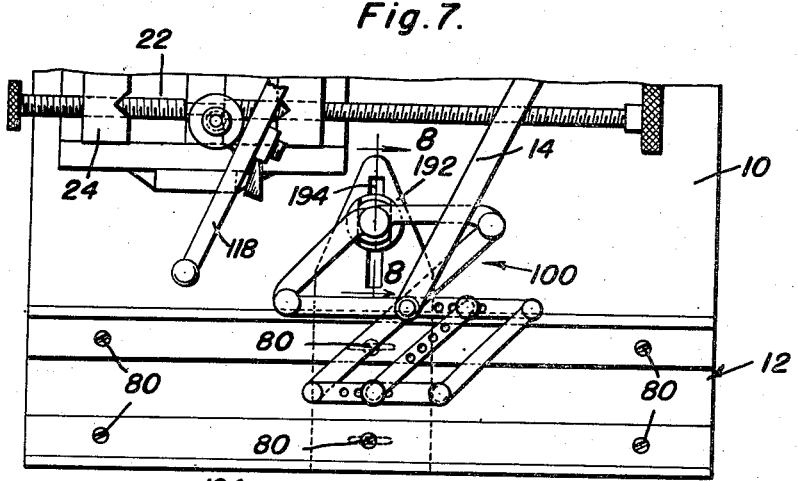
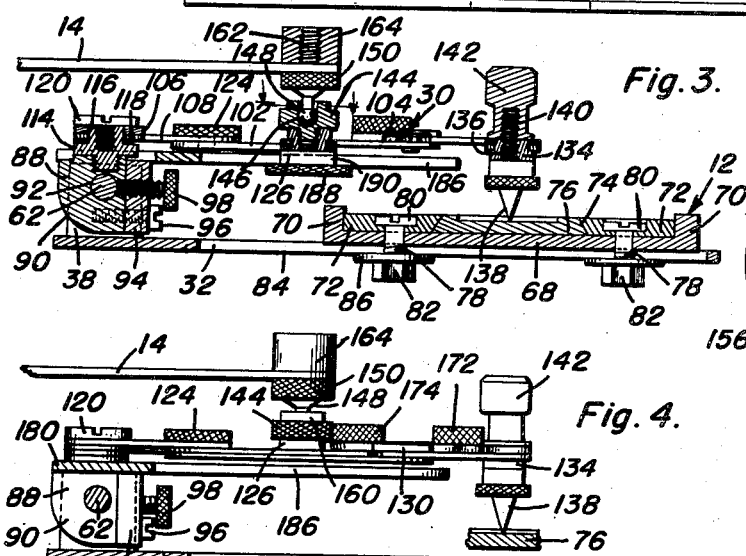
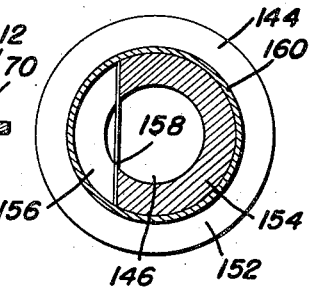
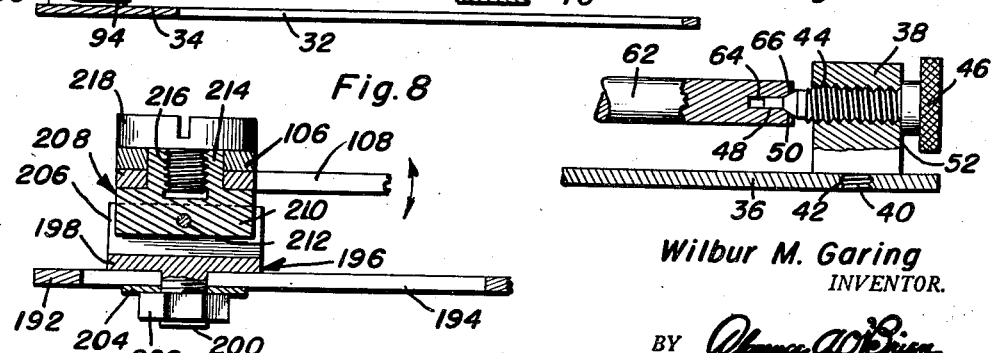
Wilbur M. Garing
INVENTOR.

June 14, 1955 — W. M. GARING — 2,710,452
PANTOGRAPH ATTACHMENT
Filed April 7, 1952 — 3 Sheets-Sheet 3

Wilbur M. Garing
INVENTOR.

BY *Attorneys*

United States Patent Office 2,710,452
Patented June 14, 1955

2,710,452
PANTOGRAPH ATTACHMENT
Wilbur M. Garing, Torrington, Wyo.
Application April 7, 1952, Serial No. 280,998
12 Claims. (Cl. 33—25)

The present invention relates in general to pantograph attachments, and more particularly to pantograph attachments for use in combination with jeweler's engraving machines whereby the characters engraved may be greatly varied.

The primary object of this invention is to provide an improved pantograph attachment intended primarily for use and combination with a jeweler's engraving machine and adapted to be attached to the free end of the tracing arm of the machine in order to enable the machine to produce numerous variations of a character with a single template.

Another object of this invention is to provide an improved pantograph attachment for jeweler's engraving machines, said pantograph attachment being so constructed and designed whereby the character engraved by the jeweler's engraving machine utilizing said pantograph attachment may be made either larger or smaller than the character previously attainable.

Another object of this invention is to provide an improved pantograph attachment for jeweler's engraving machines, said pantograph attachment being capable of forming characters when utilized in combination with the jeweler's engraving machines which are of the same width as characters normally used, but are of a variable height.

Another object of this invention is to provide an improved pantograph attachment for use in combination with an engraving machine, said pantograph attachment being of a simple construction whereby it may be easily assembled and is economically feasible.

Another object of this invention is to provide an improved pantograph attachment adapted for use in combination with a jeweler's engraving machine so as to vary either the height or the width of characters normally produced with said jeweler's engraving machine.

Another object of this invention is to provide an improved pantograph attachment which is of simple construction and may be quickly attached to a conventional jeweler's engraving machine for use in combination therewith.

A further object of this invention is to provide an improved pantograph attachment for use in combination with a jeweler's engraving machine whereby only one size of templates is necessary in order to provide characters of the usual engraving ranges.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 3 is an enlarged transverse vertical sectional view taken substantially upon the plane indicated by the section line 3—3 of Figure 1 and showing the general construction of the pantograph attachment and the manner in which the tracing arm of the engraving machine is swivelly connected thereto;

Figure 4 is an enlarged fragmentary transverse vertical sectional view taken substantially upon the plane indicated by the section line 4—4 of Figure 2 and showing the side elevational appearance of the preferred form of the improved pantograph attachment;

Figure 5 is an enlarged fragmentary longitudinal vertical sectional view taken through one end of a mounting plate for the improved pantograph attachment and shows the manner in which a track is mounted for rotation about its longitudinal axis;

Figure 6 is an enlarged transverse horizontal sectional view taken substantially upon the plane indicated by the section line 6—6 of Figure 3 and showing the arrangement of the retaining means for holding together halves of the joint permitting the swivel connection of the tracer arm of the engraving machine to the pantograph attachment;

Figure 7 is a fragmentary top plan view of the engraving machine of Figure 1 and showing a modified form of pantograph attachment secured thereto, the view being similar to Figure 2;

Figure 8 is an enlarged transverse vertical sectional view taken substantially upon the plane indicated by the section line 8—8 of Figure 7 and showing the manner in which one end of a pantograph leverage, which is the major portion of the pantograph attachment, is connected to a mounting plate;

Figure 1:
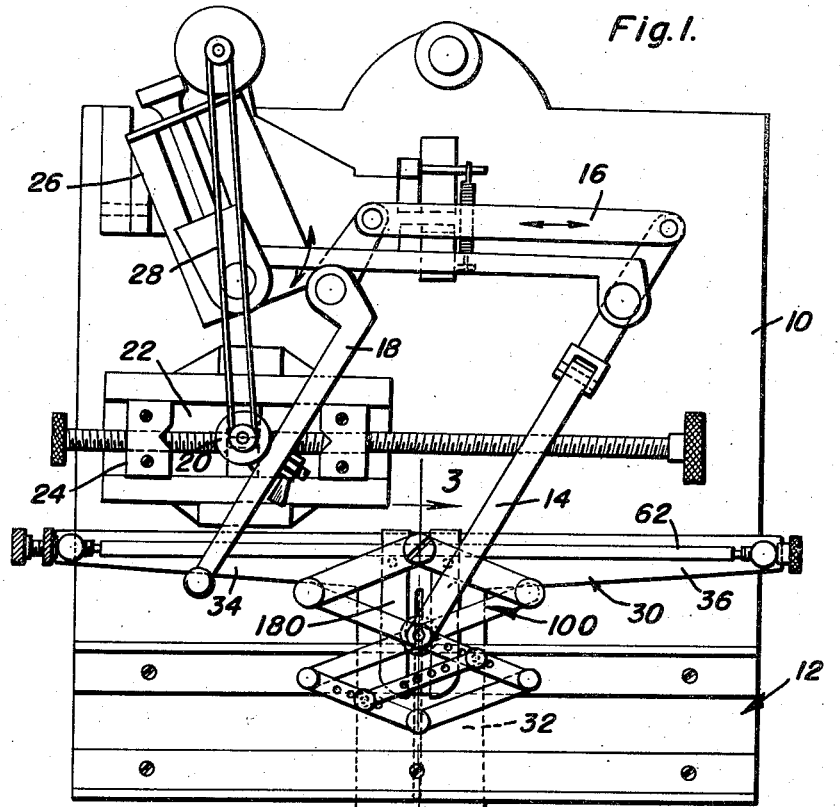
Figure 1 is a top plan view of the improved pantograph attachment, which is the subject of this invention, and shows same attached to a conventional jeweler's engraving machine, the pantograph attachment being positioned for varying one dimension only of the character normally produced by the engraving machine.
Figure 9:
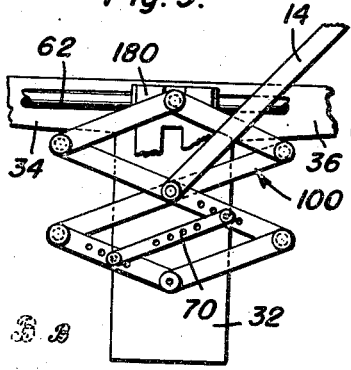
Figure 9 is a fragmentary top plan view of the central portion of the preferred form of pantograph attachment and having the end of the tracer arm only secured thereto, the view being illustrative of only one arrangement of the pantograph attachment and shows the relationship of the character formed by such arrangement with respect to the normal character produced by the engraving machine.
Figure 12:
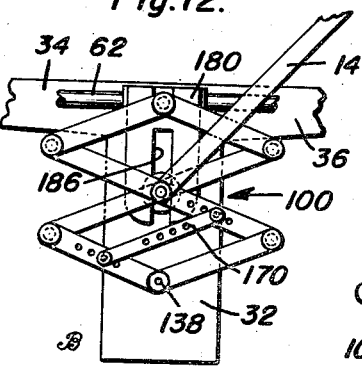
Figure 17:
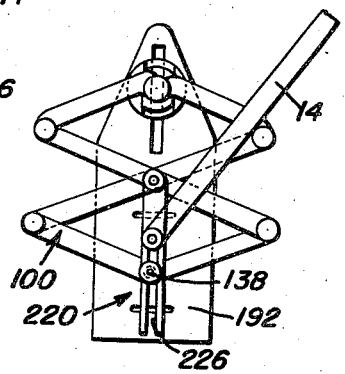
Figure 10:
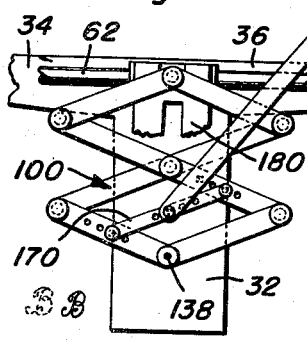
Figure 13:
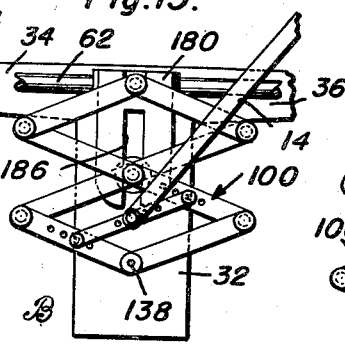
Figure 18:
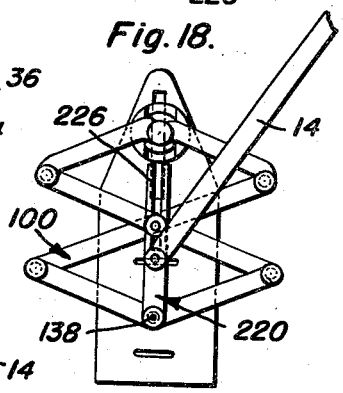
Figure 11:
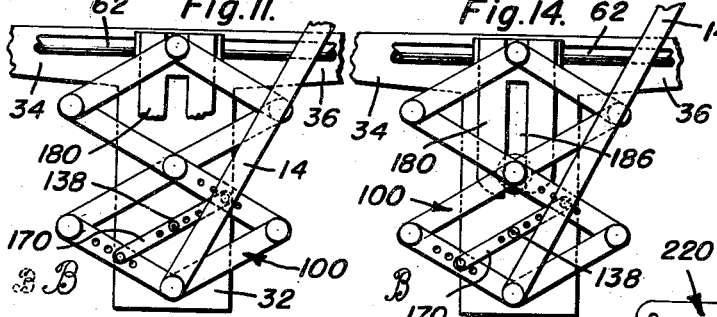
Figure 14:
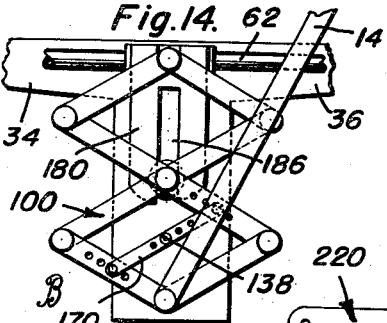
Figure 19:
Figure 15:
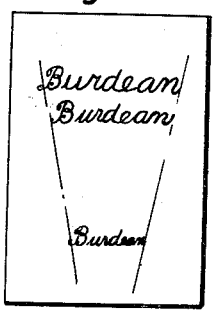
Figure 16:
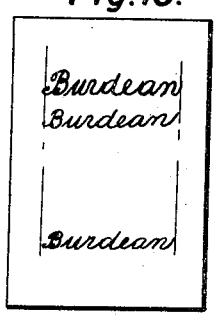
Figure 20:

Figure 10 is a top plan view of the central portion of the pantograph attachment of Figure 1 and is similar to Figure 9 with the exception that the relationship of the end of the tracing arm and a stylus carried by the pantograph attachment have been changed, the arrangement producing a slightly larger character than the arrangement of Figure 9, the character being slightly smaller than the character normally formed by the engraving machine;

Figure 11 is a fragmentary top plan view of the central portion of the preferred form of the pantograph attachment and is similar to Figures 9 and 10, the positions of the end of the tracing arm and the stylus being varied so as to produce a character which is larger than the character normally formed by the engraving machine;

Figure 12 is a fragmentary top plan view of the central portion of the preferred form of pantograph attachment, the relationship of the tracing arm and the stylus being the same as that of Figure 9 and the pantograph attachment being so positioned whereby the height of the character only is varied;

Figure 13 is a fragmentary top plan view of the central portion of the preferred form of pantograph attachment and is identical with the arrangement of Figure 10 with the exception that the pantograph leverage is so positioned to vary the height of the character only, the character being formed by this arrangement being larger than the character formed by the arrangement of Figure 12;

Figure 14 is a fragmentary top plan view similar to Figure 11 and having the pantograph leverage so positioned whereby the height only of the characters vary, the height of the character formed by the machine with this arrangement being the same as that formed by the arrangement in Figure 11;

Figure 15 is a top plan view of a plate having engraved thereon the word "Burdean" and showing the numerous variations obtainable with the pantograph leverage positioned as illustrated in Figures 9, 10 and 11;

Figure 16 is a top plan view of another plate having the word "Burdean" engraved therein, wherein the length of the word remains constant and the height of the characters only being varied, said engraving being formed by the pantograph leverage being positioned in the manner illustrated in Figures 12, 13 and 14;

Figure 17 is a top plan view of the modified form of pantograph attachment and showing the tracing arm of the engraving machine secured thereto, the pantograph leverage being provided with a bar for limiting the variation of the character to one dimension only;

Figure 18 is a top plan view similar to Figure 17 and showing a different arrangement of the bar, the tracing arm, and stylus carried by the pantograph attachment so as to reduce the characters engraved by the engraving machine in one direction only;

Figure 19 is an enlarged top plan view of the special bar adapted to be utilized with the pantograph attachment of Figure 7, the bar being rotated ninety degrees from the position illustrated in Figures 17 and 18; and, Figure 20 is a top plan view of a plate having engraved therein the word "Janice" and showing the different variations attainable by the pantograph arrangement of Figures 17 and 18.

Similar characters of reference designate similar or identical elements and portions throughout the specification and throughout the different views of the drawings.

Referring now to the accompanying drawings in detail, it will be seen that there is illustrated in Figure 1 a conventional jeweler's engraving machine which includes a base 10 having mounted on the forward end thereof a copy-holder 12. Associated with the copy-holder 12 for tracing templates (not shown) normally carried thereby is a tracing arm 14 of the engraving machine, the tracing arm 14 being connected by a pantograph system 16 to an engraving arm 18. The engraving arm 18 has mounted thereon a rotatable engraving tool 20 which overlies in plate 22 to be engaged, said plate 22 being supported in a vice structure 24. Also carried by the base 10 is a drive mechanism 26 which is connected by a drive belt 28 to the engraving tool 20 for rotating same. It will be understood that the jeweler's engraving machine described above is conventional and is not part of this invention.

Referring now to Figures 1 to 6 in particular, it will be seen that the preferred form of pantograph attachment is referred to in general by the reference numeral 30 and includes a T-shaped base having a wide stem 32 and outwardly extending arms 34 and 36 which are in alignment and form the cross arm thereof.

Referring now to Figure 5 in particular, it will be seen that the end of the arm 36 is provided with an upstanding cylindrical support 38 which is provided with a reduced externally threaded projection 40 on the lower end thereof, the projection 40 being threadedly engaged in a threaded bore 42 in the arm 36. The cylindrical support 38 is provided with a horizontally extending internally threaded bore 44 in which is threadedly engaged a special fastener 46 having a cylindrical center pin 48 formed on the outer end thereof and connected to the main portion of the fastener by a tapered shoulder 50. It will be noted that the fastener 46 has an enlarged shoulder 52 which abuts against the outer surface of the cylindrical support 38 and positions same permanently with respect thereto.

Figure 2:
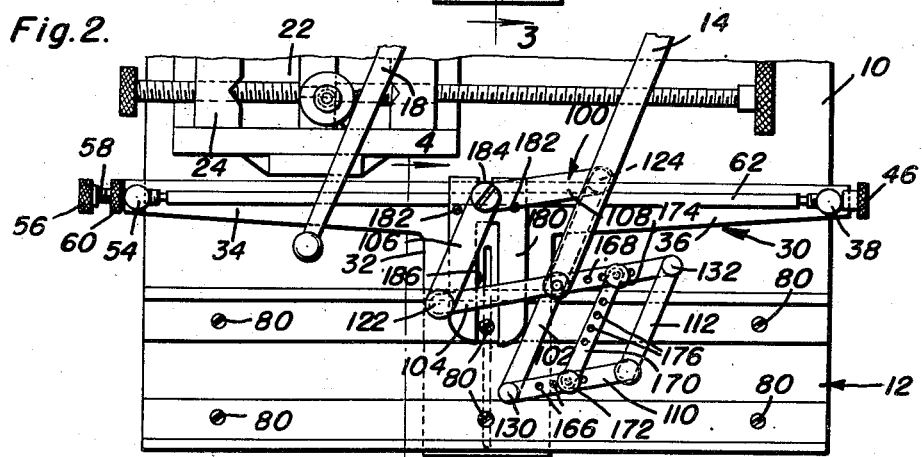
Figure 2 is a fragmentary top plan view of the jeweler's engraving machine of Figure 1 and showing the pantograph attachment arranged so as to vary both the height and the width of characters normally produced by the engraving machine.

Referring now to Figures 1 and 2 in particular, it will be seen that the arm 34 is provided with a similar cylindrical support 54 adjacent the outer end thereof in which is positioned a special fastener 56. It will be understood that the special fastener 56 is identical with the fastener 46 with the exception that it is provided with a threaded portion 58 of a greater extent than the threaded portion of the fastener 46 and is adjustably received within its associated cylindrical support 54. The fastener 56 is adjustably retained within the cylindrical support 54 by a lock nut 60 threadedly engaged thereon.

Extending between the ends of the fasteners 46 and 56 is an elongated circular rod forming a track 62. As is best illustrated in Figure 5, each end of the track 62 is provided with a concentric bore 64 adapted to receive the cylindrical end 48 of the fastener 46 and a similar end of the fastener 56. Associated with the concentric bore 64 and disposed at the outer ends of the track 62 are tapered counter-bores 66 which provides seats for the tapered shoulder 50 of the fastener 46 and a similar tapered shoulder of the fastener 56. Due to this novel connection, the track 62 is rigidly supported by the fasteners 46 and 56 and at the same time mounted for rotation about its longitudinal axis for a purpose which will be explained in more detail hereinafter.

Referring now to Figure 3 in particular, it will be seen that the copy-holder 12 of the engraving machine is generally channel-shaped in cross section and includes a flat base 68 and a pair of upstanding flanges 70. Extending longitudinally of the copy-holder 12 and resting upon the base 68 are a pair of spaced clamp bars 72 which have one vertical edge which is in engagement with its respective flange 70. The other flange of each clamp bar 72 is downwardly and outwardly tapered to form a dove-tail groove in combination with the opposed edge of the other clamp bar 72. Disposed within the dove-tail groove 74 formed by the clamp bars 72 are templates 76 having a dove-tail cross section and clampingly received within the groove 74. The clamp bar 72 is secured to the base 68 by a plurality of fasteners 78 which are provided with heads 80 countersunk within the upper surface of the clamp bars 72.

When it is desired to mount the T-shaped base of the pantograph attachment 30, the central fasteners 78 have their respective nuts 82 removed and the fasteners are positioned within an elongated longitudinally extending slot 84 in the stem 32. The nuts 82 are then replaced and after the base of the pantograph attachment 30 has been properly positioned, the nuts 82 are tightened down with the result that enlarged washers 86 disposed upon the fasteners 78 tightly clamp and position the base of the pantograph attachment 30 with respect to the copy-holder 12.

Referring now to Figures 3 and 4 in particular, it will be seen that slidably mounted on the track 62 is a generally rectangular slide block 88 which is provided with a rounded lower rear corner 90 to provide clearance with respect to the respective arms 34 and 36. The slide block 88 is provided with a longitudinally extending bore 92 in which is slidably received the track 62. Secured to the forward side of the slide block 88 is a flat longitudinally extending connecting bar 94 which is secured to the slide block 88 by a plurality of fasteners 96 threadedly engaged therewith. Carried by the connecting bar 94 and projecting through said slide block 88 into the bore 92 is a lock screw 98 which is adapted to engage the track 62 and prevent longitudinal movement of the slide block 88 with respect thereto.

Referring now to Figures 1 and 2 in particular, it will be seen that the pantograph attachment 30 includes a pantograph leverage which is referred to in general by the reference numeral 100. The pantograph leverage 100 includes a pair of bars 102 and 104 which are pivotally connected at their mid-points and have their adjacent ends connected by pairs of links. One pair of links includes short links 106 and 108 which are connected together at one end and at the other ends to the adjacent ends of the bars 104 and 102, respectively. The other pair of links includes a pair of short links 110 and 112 which are pivotally connected together at one end and at the other ends to the adjacent ends of the bars 102 and 104, respectively.

Referring now to Figure 3 in particular, it will be seen that the slide bar 88 has threadedly secured to the upper end thereof a special fastener 114 which includes a central upwardly projecting portion 116 over which are received the pivoted ends of the short links 106 and 108. It will be noted that the projecting portion 116 has a washer 118 disposed thereon and underlying the short link 108. The combined thickness of the washer 118, the first short link 106 and the second short link 108 is slightly less than the height of the projecting portion 116 and the links 106 and 108 are retained thereon by a bolt 120 which is threadedly engaged in the central portion of the projecting portion 116. By pivotally connecting the short links 106 and 108 to the fastener 114 carried by the slide bar 88, it will be seen that one end of the pantograph leverage 100 is restrained against movement.

The short links 106 and 108 are secured to their respective ends of the bars 104 and 102 by identical fasteners 122 and 124 which have reduced end portions threadedly engaged in the ends of the bars 102 and 104 and enlarged heads overlying the short links 106 and 108.

As is best illustrated in Figure 3, the bars 102 and 104 are pivotally connected together at their mid-points by an internally threaded grommet 126 which is provided with a concentric internally threaded bore 128. The links 110 and 112 are secured to the outer end of the bars 102 and 104 by fasteners 130 and 132, respectively, which have riveted over-ends and permanently connect the links to the bars for pivotal movement only. The links 110 and 112 are pivotally connected together by a grommet 134 which is similar to the grommet 126. The grommet 134 is also provided with an internally threaded bore 136 extending concentrically therethrough. It will be understood that the internally threaded bore 136 is of the same diameter as the internally threaded bore 128 of the grommet 126 and that both bores are provided with the same pitched threads.

The grommet 134 has secured thereto a stylus 138 which includes a threaded stud portion 140 which is threadedly engaged in the threaded bore 136. The stud 140 has threadedly engaged on the upper end thereof a knob 142 which functions as a handle for guiding the stylus 138 with respect to the templates 76 held by the copy-holder 12.

Threadedly engaged in the upper portion of the threaded bore 128 of the grommet 126 is a special fastener 144 which is provided with a spherical seat 146 in which is seated a spherical end portion 148 of a fastener element 150. As is best illustrated in Figure 6, the fastener 144 includes an enlarged annular flange portion 152 in which the spherical seat 146 is formed. Extending upwardly from the enlarged annular shoulder 152 is a sleeve portion 154 having a transversely extending slot 156 through one side thereof. Disposed in the transversely extending slot 156 is a short length of spring wire 158, the spring wire 158 being retained within the slot 156 by a ring 160 disposed upon the upper outer portion of the sleeve 154. The spherical portion 148 of the fastener 150 is retained within the spherical seat 146 by the spring wire 158, but may be removed from same by a snap action.

The fastener 150 is provided with an upwardly projecting threaded stud portion 162 to which is connected the free end of the tracing arm 14. The tracing arm 14 is retained upon the threaded stud 162 by a nut 164 threadedly engaged thereon. It will be understood that the free end of the tracing arm 14 is normally provided with a stylus similar to the stylus 138 and directly traces the template 76. However, by utilizing the pantograph attachment 30, the movement of the free end of the tracing arm 14 may be varied although the same template 76 is utilized. It will also be understood that the stylus 138 and its associated knob 142 may be interchanged with the fasteners 144 and 150 so as to reverse the positions of the stylus 138 and the free end of the tracing arm 14.

In order that finer variation in the movement of the free end of the tracing arm 14 may be obtainable, the link 110 and that portion of the bar 104 adjacent thereto are provided with a plurality of threaded bores 166 and 168, respectively. Extending between the link 110 and its associated end of the bar 104 is an intermediate bar 170. The ends of the bar 170 are connected to the link 110 and the bar 104 by fasteners 172 and 174 which are selectively engaged in the threaded bores 166 and 168, respectively. It will be understood that regardless of which bores the fasteners are disposed in, the intermediate bar 170 must remain in spaced parallel relation to the bar 102 and the link 112. The intermediate bar 170 is provided with a plurality of longitudinally spaced threaded bores 176 which are adapted to receive either the stylus 138 or the fasteners 144 and 150 for connecting the free end of the tracing arm 14 thereto. It will be understood that the threaded bore 176 in alignment with the grommets 126 and 134 for the selective position of the intermediate bar 170 must be utilized.

Referring now to Figure 9 in particular, it will be seen that there is illustrated by dotted lines the letter "B" which is normally formed by the engraving machine when the stylus 138 is attached directly to the free end of the tracing arm 14. When the tracing arm 14 is connected to the grommet 126 and the stylus 138 is connected to the grommet 134, any movement of the stylus 138 during its tracing movement over the template 76 results in only one-half such movement of the free end of the tracing arm 14 with result that the letter "B" formed is one-half of the size of the letter "B" normally formed by the engraving machine.

Referring now to Figure 10 in particular, it will be seen that the stylus 138 remains connected to the grommet 134, but the free end of the tracing arm 14 is now connected to one of the threaded bores 176 of the intermediate bar 170. When the stylus 138 and the tracing arm 14 are so related, movement of the stylus 138 over the template 76 results in approximately in three quarters of such movement by the free end of the tracing arm 14 with result that the letter "B" engraved is substantially three quarter the dimension of the letter "B" normally formed by the engraving machine.

Figure 11 illustrates still another relationship of the stylus 138 and the tracing arm 14 with the two being the reverse of that illustrated in Figure 10. The tracing arm 14 is now connected to the grommet 134 and the stylus 138 is connected to the intermediate bar 70. Any movement of the stylus 138 over the template 76 results in approximately four thirds such movement by the free end of the tracing arm 14 with result that the letter "B" engraved by the engraving machine using this setup is substantially four thirds times the dimension of the letter "B" normally engraved by the machine.

Referring now to Figures 2 and 3 in particular, it will be seen that overlying the upper surface of both the slide member 88 and the connecting bar 94 is a flat horizontally extending plate 180 which is secured to the upper surface of the connecting bar 94 by a pair of fasteners 182. It will be noted that the plate 180 overlies the stem 32 of the base plate and is elongated in that direction. The plate 180 is provided with a short slot 184 at the rear end thereof to provide clearance for the fastener 114 secured to the top of the slide member 88. Aligned with the slot 184 is an elongated slot 186 which opens through the forward end of the plate 180. Detachably secured to the underside of the grommet 126 is a fastener 188 which is provided with an intermediate shoulder portion 190 of a diameter substantially equal to the width of the slot 186.

It will be understood that the pantograph leverage arrangement illustrated in Figures 9, 10 and 11 is utilized in connection with the tracing arm 14 when the slide member 88 is locked to the track 62 by the locking screw 98. In this manner, the extremely rear pivot of the pantograph leverage 100 is prevented from moving longitudinally along the track 62. When the pantograph leverage 100 is provided with the fastener 188, disposed within the slot 186 the pantograph leverage 100 cannot pivot about the rear pivot and is therefore limited to movement transversely of the track 62 with respect to the slide member 88. In order that the stylus 138 may move parallel to the track 62 in order to trace a template, the lock screw 98 is released and the slide member 88 is permitted to move longitudinally along the track 62. Inasmuch as the pantograph leverage 100 is not free to move longitudinally of the track 62 without the accompanying movement of the slide member 88, it is readily apparent that regardless of the positions of the stylus 138 and the free end of the tracing arm 14, the free end of the tracing arm 14 moves the same distance longitudinally of the track 62 as it would if it were not attached to the pantograph attachment 30. Accordingly, it will be seen that the width of the character engraved by the engraving machine will remain constant and only the heights vary as long as the templates for the characters are disposed in alignment in the copy-holder 12. However, it will be understood that the templates may be aligned transversely of the copy-holder 12 and the heights of the characters will remain constant.

Referring now to Figure 12 in particular, it will be seen that the arrangement of the various elements of the pantograph leverage 100 is identical with that illustrated in Figure 9 with the exception that the central grommet 126 has secured to the underside thereof the fastener 188 and its intermediate shoulder 190 is disposed within the slot 186 of the plate 180. It will be noted that the letter "B" produced with the arrangement illustrated in Figure 12, is substantially one-half the height of the normal "B" produced with the engraving machine and has substantially the same width.

Referring now to Figure 13, it will be seen that the position of the free end of the tracing arm 14 has been varied from that illustrated in Figure 12, so as to produce a letter of a greater height. Inasmuch as the height of the letter "B" produced in this arrangement is greater than that produced with the arrangement illustrated in Figure 12, the letter does not slant as much as the shorter letter and more closely resembles the letter "B" normally produced by the engraving machine.

Referring now to Figure 14, it will be seen that the positions of the free end of the tracing arm 14 and the stylus 138 have been reversed so as to produce a letter "B" which is of a greater height than the letter "B" normally produced by the engraving machine and is equal in height to that produced by the arrangement illustrated in Figure 11. Inasmuch as the ratio of height to width is greater than that of the normal letter "B" produced by the engraving machine, the letter produced with the arrangement of Figure 4 does not slope as much as the letter normally produced by the machine.

Referring now to Figures 15 and 16, it will be seen that by rigidly connecting the slide member 88 to the track 62 and not utilizing the plate 180, the height and width of the indicia engraved retain their same ratio although the over-all proportions may be either enlarged or reduced. The indicia produced by the arrangements 12, 13 and 14, as is best illustrated in Figure 16, it remains at a constant length although the height thereof may be greatly varied.

Referring now to Figures 7 and 8, it will be seen that the pantograph leverage 100 may be secured to the engraving machine by simplified connection, if it is desired to limit the variation of the indicia engraved with the machine including the attachment to that produced by the arrangements of Figures 9, 10 and 11. The simplified attachment includes a flat plate 192 which is secured to the underside of the copy-holder 12 in the same manner as the stem 32 of the T-shaped plate of the pantograph attachment 30. However, the plate 192 is merely an elongated plate provided with a longitudinally extending elongated slot 194 at the rear end thereof.

Referring now to Figure 8 in particular, it will be seen that adjustably secured in the elongated slot 194 is a special fastener 196 having a circular base 198 which is provided with a downwardly projecting threaded stud portion 200. The threaded stud portion 200 is positioned within the elongated slot 194 and the fastener 196 is adjustably secured therein by a nut 202 mounted on the threaded stud portion 200 and clamping a washer 204 against the underside of the plate 192. Extending vertically from the circular base 198 are two upstanding spaced parallel side walls 206, the side walls 206 having their longitudinal axis parallel to the axis of the elongated slot 194.

Carried by the fastener 196 is another special fastener 208 which includes a generally rectangular base portion 210 disposed between the upstanding walls 206 and pivotally secured thereto by pivot pin 212 which extends transversely of the elongated slot 194. The base 210 is provided with a centrally located upstanding circular projection 214 which is provided with a concentric internally threaded bore 216. The fastener 208 is adapted to have received over the projection 214 the links 106 and 108 of the pantograph leverage 100 and the height of the projection 214 is slightly greater than the combined thickness of the end portions of the links 106 and 108. The links 106 and 108 are secured to the fastener 208 by the screw 218 threadedly engaged in the threaded bore 216 and overlying the top link 106.

In view of the foregoing, it will be readily apparent that the function of the pantograph leverage 100 when secured to the plate 192 is identical to that when it is connected to the T-shaped base plate and forms a part of the pantograph attachment 30. It will be seen that the fastener 208 is permitted to pivot in the same manner as the slide member 88 was permitted to pivot and that the links 106 and 108 are permitted to pivot about the fastener 208 in the same manner as they were permitted to pivot about the fastener 114. Since the manner in which the pantograph leverage 100 is attached with respect to the copy-holder 12, it will be readily apparent that a movement of the free end of the tracing arm 14 utilizing the arrangement of Figure 7 will be identical with the arrangement illustrated in Figure 2. Therefore, it will be understood that the indicia produced by utilizing the arrangement of Figure 7 will be identical with that produced by the arrangements of Figures 9, 10 and 11 and the indicia will resemble that illustrated in Figure 15.

The pantograph arrangement illustrated in Figure 7, may also be utilized to vary one dimension only of the indicia engraved by utilizing a specially elongated bar 220 which is best illustrated in Figure 19. It will be noted that the bar 220 is provided with a first aperture 222 at one end thereof and a second aperture 224 adjacent the mid-point. The other end of the bar 220 is provided with an elongated slot 226 which extends substantially to the mid-point of the bar and opens to the respective end thereof.

Referring now to Figure 17 in particular, it will be seen that the pantograph leverage 100 is illustrated as attached to the plate 192 and that the bar 220 is connected to the pantograph leverage 100 with the aperture 222 in alignment with the central grommet 126 and secured thereto by conventional fastener. The slotted portion of the bar 220 is secured to the free end of the pantograph leverage 100 by having the fastening means for the stylus 138 passing through the elongated slot 226. The free end of the tracing arm 14 is secured to the bar 220 by its fastening means passing through the aperture 224.

By closely studying the arrangement of Figure 17, it will be seen that when the stylus 138 is moved transversely of the longitudinal axis of the plate 192 the free end of the tracing arm 14 moves substantially the same transverse distance so that the width of a character produced with the attachment is substantially equal to that produced by the engraving machine without utilizing the attachment. However, inasmuch as the bar 220 is connected to the central pivot of the pantograph leverage 100 and the free end of the tracing arm 14 is secured rigidly to the bar, the longitudinal movement of the free end of the tracing arm 14 is only one-half that of the stylus 138 with the result that the character formed with the arrangement of Figure 17 is only one-half as high as the character normally engraved by the machine.

Referring now to Figure 18 in particular, it will be seen that the bar 220 has been inverted with the aperture 222 secured to the free end of the pantograph leverage 100. The conventional fastener extending upwardly from the grommet 126 of the central pivot of the pantograph leverage is slidably mounted in the elongated slot 226 and the free end the tracing arm 14 is once again connected to the elongated bar 220 through the aperture 224.

With the arrangement illustrated in Figure 18, the free end of the tracing arm 14 moves exactly the same distance as the stylus 138 which is disposed at the free end of the pantograph leverage 100 so that the height of the character engraved will be exactly the same as that of the character normally produced by the engraving machine. However, since the free end of the tracing arm 14 is connected to the pantograph leverage 100 much closer to the rear pivot of the pantograph leverage than the stylus 138, the characters produced with the arrangement will be of less width than the characters normally produced with the engraving machine.

In view of the foregoing, it will be readily apparent that a jewler's engraving machine provided with the pantograph attachment illustrated and described herein, may produce characters of various shapes and sizes normally obtainable through the use of a plurality of different types of templates by utilizing only one set of templates.

Due to the relatively simple construction of the attachment, it is readily apparent that the cost of the attachments will be much less than the cost of additional sets of templates which would be required to produce the numerous variations obtainable with the attachments of this application. Furthermore, the attachments are much more compact than the numerous additional sets of templates required to produce the same results and, therefore, they may be more easily stored.

The operation of this device will be understood from the foregoing description of the details thereof, taken in connection with the above recited objects and drawings. Further description would appear to be unnecessary.

Minor modifications of the device, varying in minor details from the embodiment of the device illustrated and described herein, may be resorted to without departure from the spirit and scope of the invention, as defined in the appended claims.

Having described the invention, what is claimed as new is:

1. A pantograph attachment for engraving machines, said pantograph attachment including a base plate adapted to be secured to said engraving machine, a pantograph leverage having one end thereof pivotally connected to said base plate, said pantograph leverage being provided with a tracing stylus and fastening means for the tracing end of a tracing arm of said engraving machine whereby varying movements are imparted to said tracing arm by movements of said tracing stylus, said tracing stylus and fastening means being disposed along the longitudinal axis of said pantograph leverage, means associated with said pantograph leverage for limiting the varying of the movement imparted to said tracing arm to one direction only, said means being in the form of an elongated bar having a longitudinal slot opening through one end thereof, said pantograph leverage including a plurality of links, first and second fasteners connecting certain of said links for pivotal movement, said elongated bar being connected to said pantograph leverage by said first fastener, a portion of said second fastener being guidingly disposed in said longitudinal slot.

2. A pantograph attachment for engraving machines, said pantograph attachment including a base plate adapted to be secured to said engraving machine, a pantograph leverage having one end thereof pivotally connected to said base plate, said pantograph leverage being provided with a tracing stylus and fastening means for the tracing end of a tracing arm of said engraving machine whereby varying movements are imparted to said tracing arm by movements of said tracing stylus, said tracing stylus and fastening means being disposed along the longitudinal axis of said pantograph leverage, means associated with said pantograph leverage for limiting the varying of the movement imparted to said tracing arm to one direction only, said means being in the form of an elongated bar having a longitudinal slot opening through one end thereof, said pantograph leverage including a plurality of links, first and second fasteners connecting certain of said links for pivotal movement, said elongated bar being connected to said pantograph leverage by said first fastener, a portion of said second fastener being guidingly disposed in said longitudinal slot, the opposite end of said bar being connected to a central pivot of said pantograph leverage and guidingly receiving an end pivot of the same.

3. A pantograph attachment for engraving machines comprising a flat plate adapted to be rigidly secured to a copy-holder of said engraving machine, a transversely extending track on said plate, a slide block slidably mounted on said track, a pantograph leverage having one end pivotally connected to said slide block, said pantograph leverage being provided with a tracing stylus and fastening means for attaching the tracing end of a tracing arm or said engraving machine, said tracing stylus and fastening means being disposed along the longitudinal axis of said pantograph leverage.

4. A pantograph attachment for engraving machines comprising a flat plate adapted to be rigidly secured to a copy-holder of said engraving machine, a transversely extending track on said plate, a slide block slidably mounted on said track, a pantograph leverage having one end pivotally connected to said slide block, said pantograph leverage being provided with a tracing stylus and fastening means for attaching the tracing end of a tracing arm of said engraving machine, said tracing stylus and fastening means being disposed along the longitudinal axis of said pantograph leverage, said fastening means including a swivel connection.

5. A pantograph attachment for engraving machines comprising a flat plate adapted to be rigidly secured to a copy-holder of said engraving machine, a transversely extending track on said plate, a slide block slidably mounted on said track, a pantograph leverage having one end pivotally connected to said slide block, said pantograph leverage being provided with a tracing stylus and fastening means for attaching the tracing end of a tracing arm of said engraving machine, said tracing stylus and fastening means being disposed along the longitudinal axis of said pantograph leverage, an intermediate bar extending between adjacent parallel arms of said pantograph leverage adjacent the free end thereof, said intermediate bar being adapted to have connected thereto either said tracing stylus or said fastening means and forming an intermediate ratio of enlargement and reduction.

6. A pantograph attachment for engraving machines comprising a flat plate adapted to be rigidly secured to a copy-holder of said engraving machine, a transversely extending track on said plate, a slide block slidably mounted on said track, a pantograph leverage having one end pivotally connected to said slide block, said pantograph leverage being provided with a tracing stylus and fastening means for attaching the tracing end of a tracing arm of said engraving machine, said tracing stylus and fastening means being disposed along the longitudinal axis of said pantograph leverage, an intermediate bar extending between adjacent parallel arms of said pantograph leverage adjacent the free end thereof, said intermediate bar being adapted to have connected thereto either said tracing stylus or said fastening means and forming an intermediate ratio of enlargement and reduction, said intermediate bar being adjustably connected to said arms whereby the ratio may be selectively varied.

7. A pantograph attachment for engraving machines comprising a flat plate adapted to be rigidly secured to a copy-holder of said engraving machine, a transversely extending track on said plate, a slide block slidably mounted on said track, a pantograph leverage having one end pivotally connected to said slide block, said pantograph leverage being provided with a tracing stylus and fastening means for attaching the tracing end of a tracing arm of said engraving machine whereby varying movements are imparted to said tracing arm by movements of said tracing stylus, said tracing stylus and fastening means being disposed along the longitudinal axis of said pantograph leverage, means associated with said pantograph leverage for limiting the varying of the movement imparted to said tracing arm to one direction only.

8. A pantograph attachment for engraving machines comprising a flat plate adapted to be rigidly secured to a copy-holder of said engraving machine, a transversely extending track on said plate, a slide block slidably mounted on said track, a pantograph leverage having one end pivotally connected to said slide block, said pantograph leverage being provided with a tracing stylus and fastening means for attaching the tracing end of a tracing arm of said engraving machine whereby varying movements are imparted to said tracing arm by movements of said tracing stylus, said tracing stylus and fastening means being disposed along the longitudinal axis of said pantograph leverage, means associated with said pantograph leverage for limiting the varying of the movement imparted to said tracing arm to one direction only, said means being in the form of an elongated bar having a longitudinal slot opening through one end thereof selectively receiving said fastening means.

9. A pantograph attachment for engraving machines comprising a flat plate adapted to be rigidly secured to a copy-holder of said engraving machine, a transversely extending track on said plate, a slide block slidably mounted on said track, a pantograph leverage having one end pivotally connected to said slide block, said pantograph leverage being provided with a tracing stylus and fastening means for attaching the tracing end of a tracing arm of said engraving machine whereby varying movements are imparted to said tracing arm by movements of said tracing stylus, said tracing stylus and fastening means being disposed along the longitudinal axis of said pantograph leverage, means associated with said pantograph leverage for limiting the varying of the movement imparted to said tracing arm to one direction only, said means being in the form of an elongated bar having a longitudinal slot opening through one end thereof selectively receiving said fastening means, the opposite end of said bar being rigidly connected to said slide block.

10. A pantograph attachment for engraving machines comprising a flat plate adapted to be rigidly secured to a copy-holder of said engraving machine, a transversely extending track on said plate, a slide block slidably mounted on said track, a pantograph leverage having one end pivotally connected to said slide block, said pantograph leverage being provided with a tracing stylus and fastening means for attaching the tracing end of a tracing arm of said engraving machine, said tracing stylus and fastening means being disposed along the longitudinal axis of said pantograph leverage, means on said slide bar for locking said slide bar to said track.

11. A pantograph attachment for engraving machines comprising a flat plate adapted to be rigidly secured to a copy-holder of said engraving machine, a transversely extending track on said plate, a slide block slidably mounted on said track, a pantograph leverage having one end pivotally connected to said slide block, said pantograph leverage being provided with a tracing stylus and fastening means for attaching the tracing end of a tracing arm of said engraving machine, said tracing stylus and fastening means being disposed along the longitudinal axis of said pantograph leverage, means on said slide bar for locking said slide bar to said track, said track being mounted for rotation about its longitudinal axis.

12. A pantograph attachment for engraving machines comprising a flat plate adapted to be rigidly secured to a copy-holder of said engraving machine, a transversely extending track on said plate, a slide block slidably mounted on said track, a pantograph leverage having one end pivotally connected to said slide block, said pantograph leverage being provided with a tracing stylus and fastening means for attaching the tracing end of a tracing arm of said engraving machine whereby varying movements are imparted to said tracing arm by movements of said tracing stylus, said tracing stylus and fastening means being disposed along the longitudinal axis of said pantograph leverage, an intermediate bar extending between adjacent parallel arms of said pantograph leverage adjacent the free end thereof, said intermediate bar being adapted to have connected thereto either said tracing stylus or said fastening means and forming an intermediate ratio of enlargement and reduction, means associated with said pantograph leverage for limiting the varying of the movement imparted to said tracing arm to one direction only.

References Cited in the file of this patent

UNITED STATES PATENTS

| | | |
|---|---|---|
| 8,991 | Taylor | June 1, 1852 |
| 184,493 | Anderson | Nov. 21, 1876 |
| 544,367 | Muehlenbeck | Aug. 13, 1895 |
| 2,615,251 | Edmunds | Oct. 28, 1952 |
| 2,645,853 | Kaufman | July 21, 1953 |

FOREIGN PATENTS

| | | |
|---|---|---|
| 451,479 | Great Britain | Aug. 6, 1936 |